United States Patent

Chopping

Patent Number: 6,041,055
Date of Patent: Mar. 21, 2000

[54] MULTIPURPOSE SYNCHRONOUS SWITCH ARCHITECTURE

[75] Inventor: Geoffrey Chopping, Wimborne, United Kingdom

[73] Assignee: Marconi Communications Limited, United Kingdom

[21] Appl. No.: 08/716,253

[22] PCT Filed: Mar. 23, 1995

[86] PCT No.: PCT/GB95/00661

§ 371 Date: Oct. 24, 1996

§ 102(e) Date: Oct. 24, 1996

[87] PCT Pub. No.: WO95/26600

PCT Pub. Date: Oct. 5, 1995

[30] Foreign Application Priority Data

Mar. 25, 1994 [GB] United Kingdom .................... 9405993

[51] Int. Cl.[7] ............................ H04L 12/28; H04L 12/56; H04L 12/50; H04Q 11/00
[52] U.S. Cl. ........................... 370/391; 370/375; 370/907
[58] Field of Search ..................... 370/542, 543, 370/544, 536, 907, 516, 353, 354, 375, 391, 395, 465, 466, 468

[56] References Cited

U.S. PATENT DOCUMENTS

| | | | |
|---|---|---|---|
| 4,967,405 | 10/1990 | Upp et al. | 370/465 |
| 5,060,227 | 10/1991 | Finley et al. | 370/466 |
| 5,247,518 | 9/1993 | Takiyasu et al. | 370/466 |
| 5,345,439 | 9/1994 | Marston | 370/320 |
| 5,421,030 | 5/1995 | Baran | 455/5.1 |

FOREIGN PATENT DOCUMENTS

| | | |
|---|---|---|
| 0 368 501 A1 | 5/1990 | European Pat. Off. . |
| 0 397 197 A3 | 11/1990 | European Pat. Off. . |

*Primary Examiner*—Michael Horabik
*Assistant Examiner*—Kevin C. Harper
*Attorney, Agent, or Firm*—Kirschstein, et al.

[57] ABSTRACT

The flexibility of a telecommunications switch fabric can be improved by making the fabric multipurpose. Where a switch fabric has two or more switches of different granularities, they may be connected by a terminating device in which the higher granularity circuits from the first switch are terminated and demultiplexed into the lower granularity circuits for the second switch, in addition to the lower granularity circuits from the second switch being multiplexed together to form higher granularity circuits for the first switch.

3 Claims, 4 Drawing Sheets

MULTIPURPOSE SYNCHRONOUS SWITCH ARCHITECTURE

BACKGROUND OF THE INVENTION

A good telecommunications switch needs more than just sound switching theory, it needs to meet its functional requirements and it also needs to be a soundly engineered product.

There are many switching theory techniques, a number of ways of functionally partitioning such techniques, and even more implementation methods.

SUMMARY OF THE INVENTION

According to the present invention there is provided a telecommunications switch fabric comprising at least two switches of different granularities which are connected together by means of a terminating device wherein the higher granularity circuits from the first switch are terminated and demultiplexed into the lower granularity circuits for the second switch in addition to the lower granularity circuits from the second switch being multiplexed together to form higher granularity circuits for the first switch.

In a preferred embodiment the circuits handled by the first switch are Virtual Containers (VCs) and the circuits handled by the second switch are 64 kbit/s circuits and the terminating device is a Multiple Primary Rate Terminating device which unpacks the VCs received from the VC switch and extracts the frame alignment signal therefrom and aligns the circuits contained by the VCs to the timing of the 64 kbit/s switch before transmitting the circuits to the 64 kbit/s switch as well as receiving the 64 kbit/s circuits from the 64 kbit/s switch and adding the primary rate framing information and the VC overhead and justification information before transmitting the VCs to the VC switch.

In an alternative embodiment the circuits handled by the first switch are Virtual Containers (VCs) and the circuits handled by the second switch are ATM cells and the terminating device is a Header Translation Unit which unpacks the VCs received from the VC switch and extracts the ATM cells before transmitting the cells to the ATM switch as well as receiving the cells from the ATM switch and adding the VC overhead and justification information before transmitting the VCs to the VC switch.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
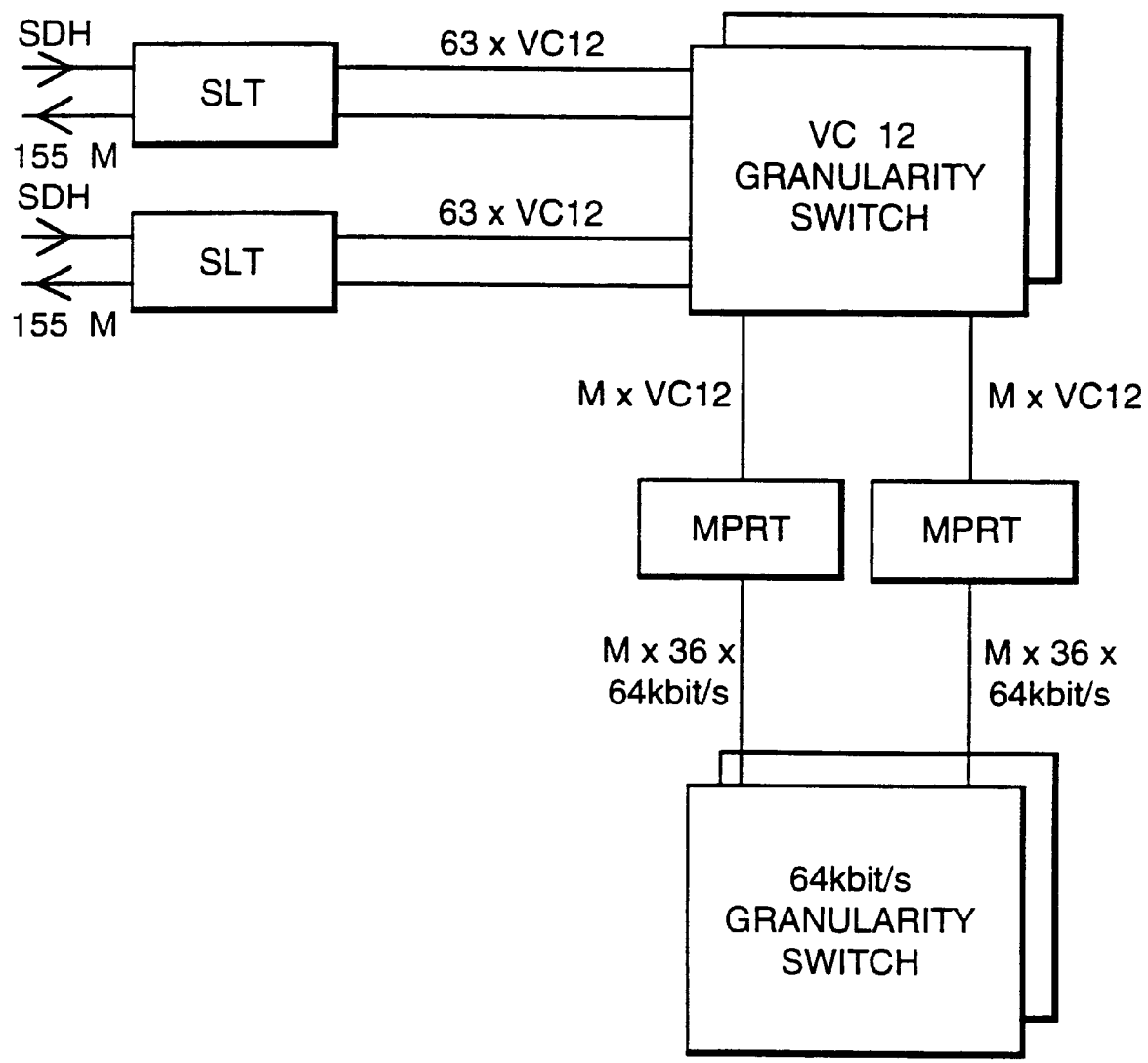
FIG. 1 shows an example of a Single Fabric 64 kbit/s and VC switch.

A reconfigurable switch memory which is applicable to time switches and space switches enables two very different time switching functions to be efficiently implemented by one type of switching unit.

Such a reconfigurable switching device may for instance work in either one bit or five bit mode, the granularity of the switch being varied.

An example is where a Synchronous Transfer Mode Switch (STM) having means for a plurality of STM-1 interfaces is further arranged for 32 kbit/s, 64 kbit/s or Virtual Container (VC) switching.

Such reconfigurable switches are described in United Kingdom Patent Application No. GB 2264612A imported herein by reference.

Additionally, in United Kingdom Patent Application No. GB9309449.8, a multiplexer/demultiplexer (mux/demux) described which is used with a multiplexer format comprising a plurality of CBR time slots wherein a time slot which is not used for CBR traffic is used for message based traffic to provide a composite CBR/message based data stream. For example, the mux/demux could carry CBR services based on a regular $125\mu$ seconds time base as well as statistical traffic based on ATM cells. United Kingdom Patent Application No. 9309449.8 is imported herein by reference.

A switch has to be able to transfer input circuits to output circuits. A multipurpose switch must be able to handle more than one type of circuit.

One way of achieving this is to have parallel switch fabrics within the switch which handle the different circuit types.

Another method is to transform one circuit of type B into one or more type A circuits, in which case only a type A switch is needed. Another circuit of type C can also be transformed so that it too can be switched by a type A switch.

The first method is clearly inefficient and wasteful, while the second method is only efficient if the transforms are reasonably straight forward.

Because of the gross differences between Asynchronous Transfer Mode (ATM) circuits, with irregular arrival rates of cells; and constant bit rate (CBR) circuits, with one or more bytes per frame, the idea of carrying ATM circuits on a synchronous switching fabric previously has been rejected. In any case, because there is no satisfactory method of interworking between ATM and CBR circuits, there is very little advantage in even attempting to use the same fabric, especially as mixing of ATM and CBR circuits on the same STM-1 interface is not specified.

There are two simple measures of switch capacity:

interface bandwidth capacity; which is the sum of the bandwidths of all the interfaces, and circuit capacity; which is the total number of circuits the switch fabric can switch.

For a particular interface bandwidth capacity, as the granularity of the switch reduces the circuit capacity increases. As the circuit capacity increases the memory requirements of the switching elements increase as does the complexity of the control mechanisms.

Over a range of interface bandwidth capacities and a range of switching granularities the switching memory requirements and the complexity of the control can vary very considerably.

It is apparent that if the switching granularity could increase as the interface bandwidth increases then the circuit capacity would remain constant as would the control complexity.

Examples of common granularities are 64 kbit/s and columns. Columns are 9 times 64 kbit/s. SDH uses multiple columns to carry Virtual Contains. A 2048 kbit/s stream is carried in a 4 column virtual container (VC12).

In United Kingdom Patent Application No. GB 2264612A it has been explained how a family of switches can be constructed from a small range of switching functions.

They provide 3 stage and single stage VC switches as well as 3 stage and single stage 64 kbit/s switches.

Although it is possible to use the fine granularity switches to carry VC traffic and in certain cases this will be appropriate, the STM-1 Line Termination (SLT) is much more complex if it not only has to rejustify the VCs onto the switch timing but also has to terminate the 2048 kbit/s contained within the payloads and perform aligner functions.

When most of the VCs are to be switched as complete VCs and not broken down to 64 kbit/s it is sensible to terminate the STM-1s on interface cards which do not perform the 2048 kbit/s termination functions.

Before switching at 64 kbit/s, a VC1 must be switched across to a Primary Rate Terminal (PRT) which unpacks the VC1 and finds the Frame Alignment Signal, monitors the line conditions and aligns the 64 kbit/s circuits onto the switching timing. Several Parts can be contained on a Multiple PRT (MPRT) card.

FIG. 1 shows a single switch fabric with STM-1 Line Terminations (SLT) and Multiple Primary Rate Terminations (MPRT). This is performing some through VC switching and some 64 kbit/s switching.

Figure 2:
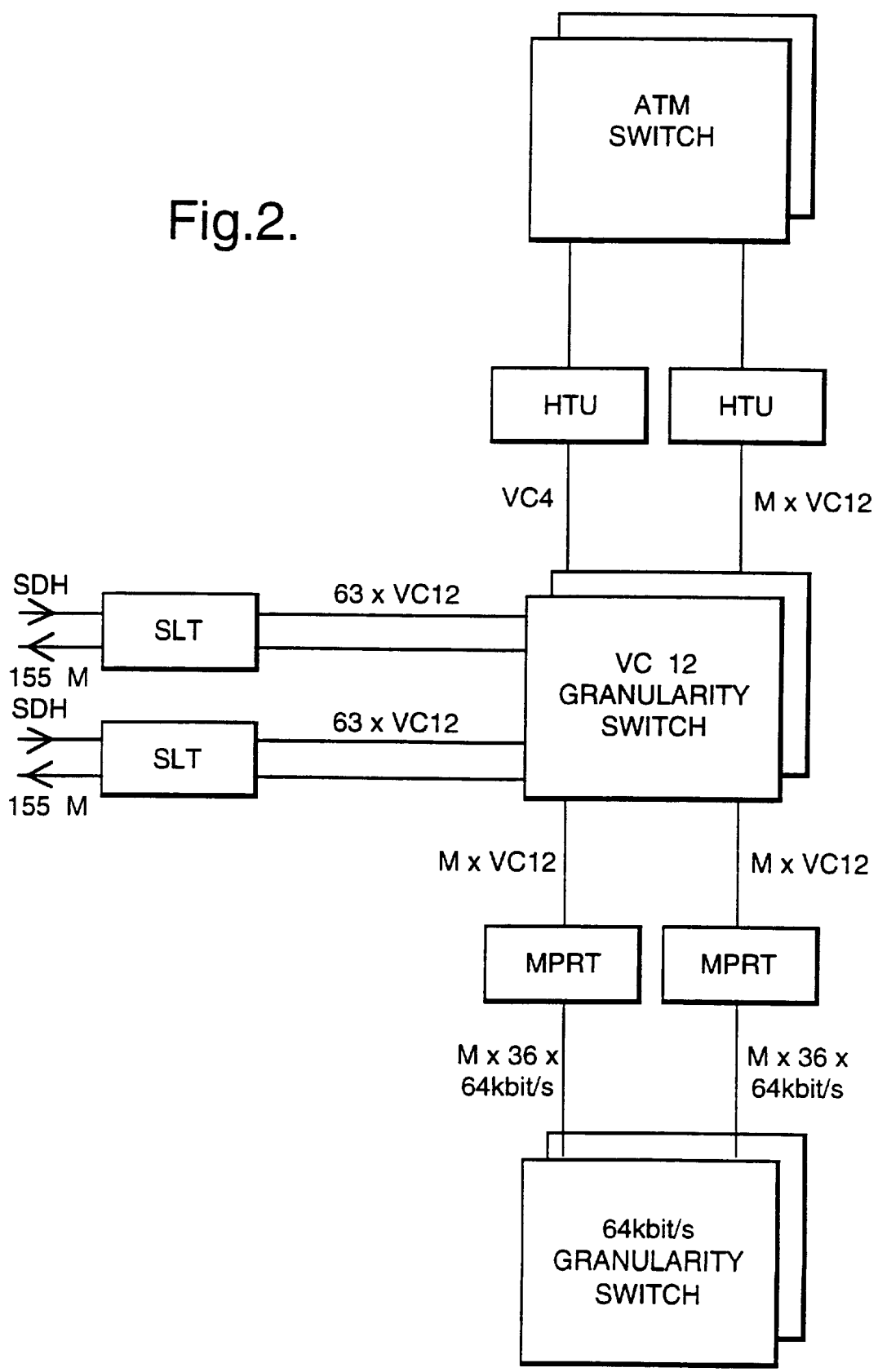
FIG. 2 shows an example of separate ATM, 64 kbit/s and VC Switch Fabrics.

FIG. 2 shows two fabrics which are performing the same overall function.

For simplicity, the figures do not show units handling, subscriber circuits, signalling, 2048 kbit/s line circuits, etc.

The multiple switch concept of the earlier applications referred to above are developed into a Serial (rather than parallel) form of Hybrid switching.

It appears that serial switching architectures are more efficient than parallel switching architectures.

Referring again to FIG. 1 one switch is a large SDH crossconnect and the other a small 64 kbit/s granularity service switch.

Through SDH traffic only passed through the VC12 granularity switch, so only needs to be handled by the SLT.

64 kbit/s traffic must be passed across the SLT and VC12 switch to reach the MPRT (Multiple Primary Rate Terminal) so that the multiplex can be aligned prior to being switched by the 64 kbit/s switch.

FIG. 2 has an ATM switch added to the switch of FIG. 1.

Some ATM VC4 traffic is switched as a VC4 across the VC12 switch to a VC4 HTU. The other HTU shown expects M (presumably 63)×VC12 for low rate ATM.

Some of the VC12s received on an STM-1 interface are not for through switching, or 64 kbit/s switching, but are of ATM format for ATM switching.

Consequently, the ATM traffic must be passed across the SLT and VC12 switch to reach the HTU (Header Translation Unit) and other termination functions that are necessary for ATM switching.

Figure 3:
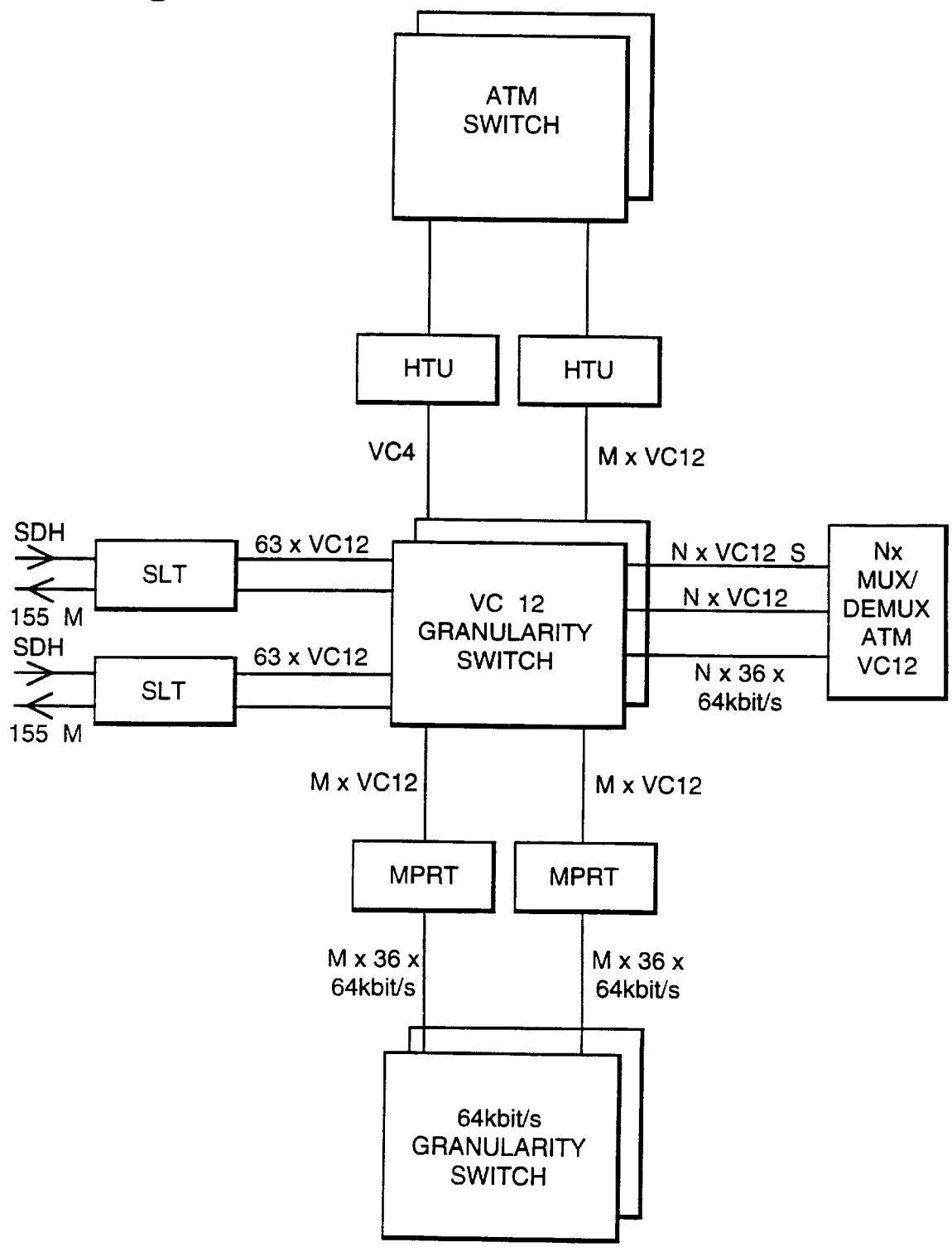
FIG. 3 shows separate ATM, 64 kbit/s and VC switch fabrics with a multiple mux/demux for ATM and VC12.

FIG. 3 not only has the ATM switch but also multiplexers/demultiplexers as described in United Kingdom Patent Application No. GB 9309449.8. Any further reference to a multiplexer or demultiplexer following, is to such a device.

In this case a 2 Mbit/s, carried as a VC12 which contains 64 kbit/s and ATM traffic using the multiplexer format, has to be handled in the following way;

Arrives on STM-1
Rejustified by the SLT
VC12 Switched to
demultiplexer and split into
64 kbit/s VC12                           and    ATM VC12
VCI2 switched to                                VCI2 switched to
MPRT and split                                  VC12 HTU and split
into 64 kbit/s circuits                         into cells
64 kbit/s switched to                           cells switched to
MPRT and formed                                 VC12 HTU and formed
into 64 kbit/s VC12                             into ATM VC12
VC12 switched to                                VC12 switched to
multiplexer again
VC12 switched to
SLT and transmitted by STM-1

Figure 4:
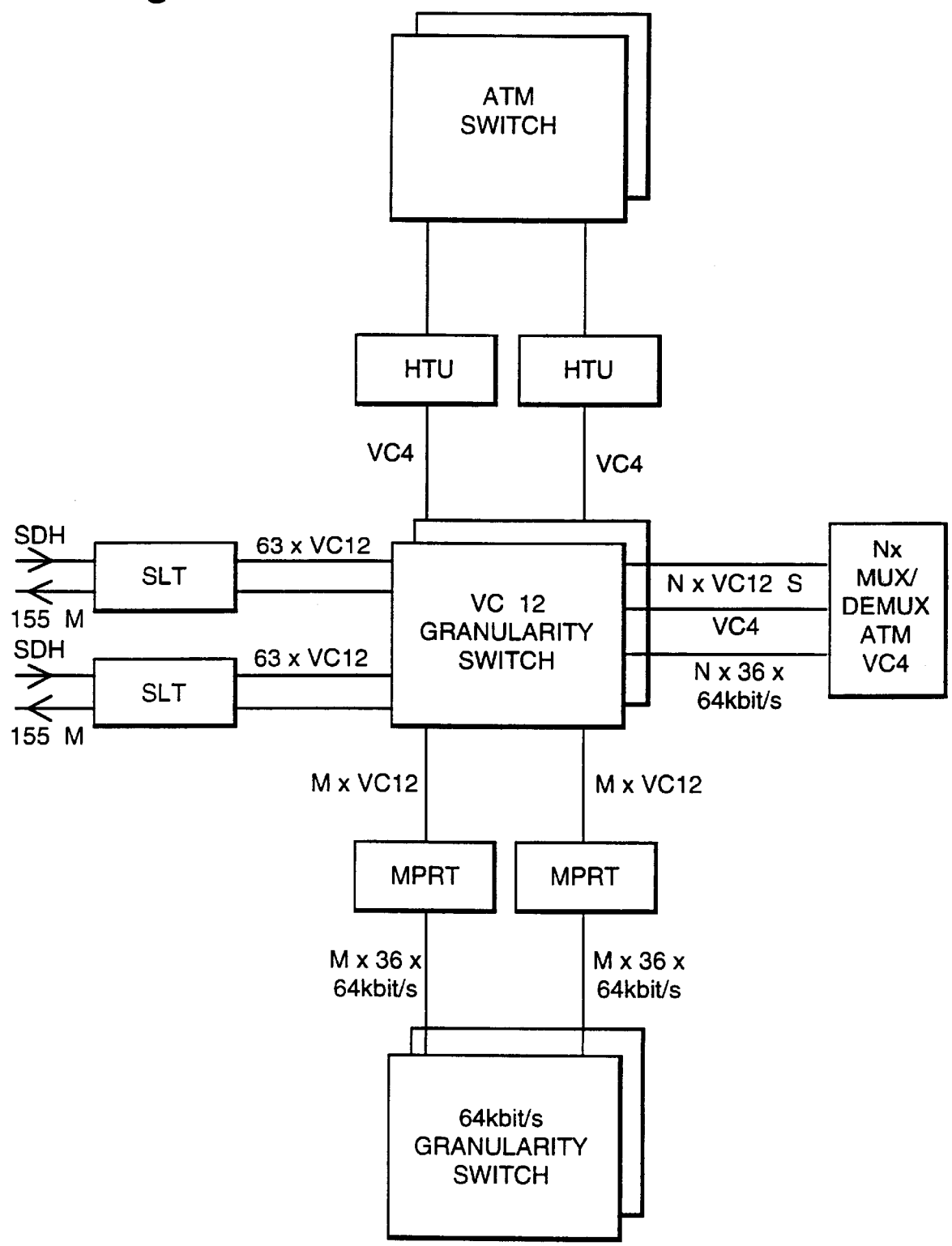
FIG. 4 shows separate ATM, 64 kbit/s and VC switch fabrics with a multiple mux/demux for ATM and VC4.

FIG. 4 only shows VC4 HTUs. The ATM stream from the multiplexer/demultiplexer is not N×VC12 but a VC4, the other interfaces to the Multiplexer being the same.

In this case a 2 Mbit/s carried as a VC12 which contains 64 kbit/s and ATM traffic using the multiplexer format, has to be handled in the following way;

Arrives on STM-1
Rejustified by the SLT
VC12 Switched to
the demultiplexer and split into
64 kbit/s VC12                           and    part of ATM VC4
VC12 switched to                                VC4 switched to
MPRT and split                                  VC4 HTU and split
into 64 kbit/s circuits                         into cells
64 kbit/s switched to                           cells switched to
MPRT and formed                                 VC4 HTU and formed
into 64 kbit/s VC12                             into ATM VC4
VC12 switched to                                VC4 switched to
multiplexer again
VC12 switched to
SLT and transmitted by STM-1

If the ATM switch has no capability for accepting Low Rate ATM links then an N×low rate to high rate mux would be needed.

The methods described may seem to have rather a large number of passes across the switches. It may seem much easier to draw a box and call it a hybrid switch. Unfortunately until the contents of such a switch are defined, the complexity of having parallel switching capability and the overhead of all the switch interfaces being able to handle all levels of SDH rejustification, dejustification, 2048 kbit/s termination, ATM header translation and policing; then the simple box may seem easier, but it could prove to be a very misleading assumption.

The serial architecture means that only the SDH interfaces are unsecured and not replaceable by a switching action. The HTU, multiplexer and MPRT units can all be replaced on a one for N sparing arrangement. This should help to simplify maintenance, routing and resource management.

Bearing in mind the unproven case for universal ATM networks, the use of switches with a small ATM (or any other data switch) and such multiplexing appears to offer a far more practical solution.

Clearly when there is only one switch fabric it must be working at 64 kbit/s granularity. When there are two fabrics one can be a VC only fabric which can grow to a much larger size than a 64 kbit/s switch.

Some of examples are given below;

Combined SDH Add and Drop Multiplexer and Concentrator with Single Stage VC Switch and Single Stage 64 kbit/s Switch.

Small Crossconnect and Small PSTN Host Exchange with One 3 stage 64 kbit/s switch, handling 64 kbit/s circuits and Vas.

Major Crossconnect and Major PSTN Host Exchange.

A 3 stage VC switch and a 3 stage 64 kbit/s Switch.

These examples give an insight of the flexibility offered by this switching architecture and the use of Multiple Primary Rate Terminations to link between switches or to loop back onto the same switch.

I claim:

1. A telecommunications switch fabric, comprising: at least a first switch and a second switch, said first and second switches having different higher and lower granularities, a terminating device for connecting the first and second switches together, and including terminating and multiplexing/demultiplexing means, for terminating and demultiplexing the higher granularity circuits from the first switch into the lower granularity circuits for the second switch, and for multiplexing the lower granularity circuits from the second switch together to form the higher granularity circuits for the first switch, and only one of the first and second switches having external connections which are not connected to another switch of the switch fabric.

2. The telecommunications switch fabric as claimed in claim 1, wherein the higher and lower granularity circuits of the first switch are Virtual Containers (VCs), and wherein the higher and lower granularity circuits of the second switch are 64 kbit/s circuits, and wherein the terminating device is a Multiple Primary Rate Terminating Device for unpacking the VCs received from the first switch and for extracting a frame alignment signal therefrom, and for aligning the circuits contained by the VCs to the timing of the second switch before transmitting these circuits to the second switch, as well as for receiving 64 kbit/s circuits from the second switch and adding primary rate framing information and VC overhead and justification information before transmitting them to the first switch.

3. The telecommunications switch fabric as claimed in claim 1, wherein the higher and lower granularity circuits of the first switch are Virtual Containers (VCs), and wherein the higher and lower granularity circuits of the second switch are Asynchronous Transfer Mode (ATM) cells, and wherein the terminating device is a Header Translation Unit for unpacking the VCs received from the first switch, and for extracting the ATM cells before transmitting the ATM cells to the second switch, as well as for receiving the ATM cells from the second switch and adding VC overhead and justification information before transmitting them to the first switch.

* * * * *